US008338528B2

(12) United States Patent
Scholz et al.

(10) Patent No.: US 8,338,528 B2
(45) Date of Patent: Dec. 25, 2012

(54) RTV TWO-COMPONENT SILICONE RUBBER

(75) Inventors: Mario Scholz, Gruendau (DE); Juergen Meyer, Stockstadt (DE); Gerald Wissler, Mainhausen (DE)

(73) Assignee: Evonik Degussa GmbH, Essen (DE)

( * ) Notice: Subject to any disclaimer, the term of this patent is extended or adjusted under 35 U.S.C. 154(b) by 82 days.

(21) Appl. No.: 12/600,488

(22) PCT Filed: May 6, 2008

(86) PCT No.: PCT/EP2008/055539
§ 371 (c)(1),
(2), (4) Date: Nov. 17, 2009

(87) PCT Pub. No.: WO2008/145485
PCT Pub. Date: Dec. 4, 2008

(65) Prior Publication Data
US 2010/0168326 A1 Jul. 1, 2010

(30) Foreign Application Priority Data
Jun. 1, 2007 (DE) .................. 10 2007 025 685

(51) Int. Cl.
C08L 83/00 (2006.01)
(52) U.S. Cl. ....................................... 524/588
(58) Field of Classification Search .................. 524/588
See application file for complete search history.

(56) References Cited

U.S. PATENT DOCUMENTS

| 3,122,516 | A | * | 2/1964 | Polmanteer | 524/731 |
|---|---|---|---|---|---|
| 4,147,855 | A | * | 4/1979 | Schiller et al. | 528/23 |
| 4,427,801 | A | * | 1/1984 | Sweet | 523/212 |
| 4,701,491 | A | * | 10/1987 | Lamont et al. | 524/493 |
| 5,008,305 | A | * | 4/1991 | Kennan et al. | 523/212 |
| 5,112,885 | A | | 5/1992 | Inoue et al. | |
| 5,623,028 | A | | 4/1997 | Fitzgerald et al. | |
| 5,750,258 | A | * | 5/1998 | Sakai et al. | 428/405 |
| 5,770,140 | A | * | 6/1998 | Muller | 264/236 |
| 5,998,516 | A | | 12/1999 | Burkus, II et al. | |
| 6,022,904 | A | * | 2/2000 | Sollradl et al. | 521/154 |
| 6,172,150 | B1 | * | 1/2001 | Kollmann et al. | 524/379 |
| 2007/0173587 | A1 | | 7/2007 | Scholz et al. | |
| 2007/0191537 | A1 | * | 8/2007 | Meyer et al. | 524/588 |
| 2007/0244230 | A1 | * | 10/2007 | Sixt et al. | 524/128 |

FOREIGN PATENT DOCUMENTS

| CN | 1930224 A | 3/2007 |
|---|---|---|
| DE | 196 16 781 | 11/1997 |
| DE | 102004005156 | * 8/2005 |
| JP | 7-165980 | 6/1995 |
| JP | 10-87317 | 4/1998 |
| WO | 2005/095503 | 10/2005 |

OTHER PUBLICATIONS

Machine-generated English-language translation of DE-102004005156, translation generated on Jun. 16, 2011, 3 pages.*
Certified English-language translation of DE-102004005156, translation generated on Jan. 2012, 20 pages.*
Technical data sheet for Silopren U 10 from Momentive, 2 pages, no date given.*
Chinese Office Action issued Jun. 22, 2011, in Patent Application No. 200880018090.X (with English-language translation).
Japanese Office Action issued Jun. 28, 2012, in Patent Application No. 2010-509775 (English Translation).

* cited by examiner

*Primary Examiner* — Robert S Loewe
(74) *Attorney, Agent, or Firm* — Oblon, Spivak, McClelland, Maier & Neustadt, L.L.P.

(57) ABSTRACT

RTV two-component silicone rubber which contains structurally modified hydrophobic fumed silicas which have vinyl groups fixed on the surface, further hydrophobic groups, such as trimethylsilyl and/or dimethylsilyl and/or monomethylsilyl groups, additionally being fixed on the surface.

9 Claims, No Drawings

RTV TWO-COMPONENT SILICONE RUBBER

The invention relates to RTV two-component silicone rubber, a process for its preparation and its use.

RTV two-component silicone rubbers are two-component, castable and spreadable or kneadable materials which vulcanize to highly resilient silicone rubber after addition of the curing component. The crosslinking takes place at room temperature ("RTV"—room temperature vulcanization).

There are two types of vulcanization: condensation crosslinking and addition crosslinking.

In condensation crosslinking, an organotin catalyst is used, alcohol forming as a by-product.

Addition crosslinking makes use of a platinum catalyst without forming cleavage products.

Most vulcanizates of RTV-2 silicone rubbers retain their full resilience up to +200° C. Some products even have a load-bearing capability briefly up to +300° C. At low temperatures, the flexibility is retained throughout down to −50° C., and in the case of special types even down to −100° C.

In general, the thermal conductivity permits insulation of electrical means of operation without a heat buildup.

Of particular use are the electrical properties, in particular the insulation resistance, the dielectric strength and the dielectric loss factor. Regarding the gas permeability at room temperature, RTV-2 silicone rubbers give a value ten times higher than natural rubber. Even as a result of weathering in the open air for years, the weathering- and ageing-resistant material experiences no substantial change in its properties.

The pronounced separation effect of the vulcanizate surfaces from organic and inorganic materials is also advantageous for many applications.

Owing to the extensive product range of the various RTV-2 silicone rubber types, it is possible to prepare vulcanizates having very versatile and also highly specialized properties. This results in numerous successful solutions to problems in a very wide range of industrial areas, such as, for example, in mould construction, in electronics, in machine building and the construction of industrial parts and in medicine.

In general, silicone rubbers and vulcanized silicone rubber have a density of 1.1 to 1.3 g/cm$^3$ and are resilient from −60° C. to 200° C. (special types from −90° C. to 250° C.).

Silicone rubbers are materials which can be converted into the rubber-elastic state and which contain, as base polymers polydiorganosiloxanes which have groups accessible to crosslinking reactions. Hydrogen atoms, hydroxyl groups and vinyl groups, which are present at the chain ends but may also be incorporated into the chain, are predominantly suitable as such. Fillers whose type and amount substantially influence the mechanical and chemical behaviour of the vulcanizates are incorporated as reinforcing agents into this system. Silicone rubber and vulcanized silicone rubber can be coloured by inorganic pigments.

A distinction is made between high temperature and room temperature vulcanized (=HTV/RTV) silicone rubbers. The HTV silicone rubbers are generally plastically deformable, still flowable materials which contain finely divided silica and, as crosslinking catalysts, organic peroxides and, after vulcanization at temperatures greater than 100° C., give heat-resistant silicone elastomers (vulcanized silicone rubber) which are resilient between −100° C. and +250° C. and are used, for example, as sealing, damping and electrical insulation materials, cable sheaths and the like.

Another crosslinking mechanism consists in addition of Si—H groups at silicon-bonded vinyl groups, both of which are incorporated into the polymer chains or at the ends thereof, said addition generally being catalyzed by noble metal compounds. Since 1980, a liquid silicone rubber (LSR) technology has become established in which two liquid silicone rubber components are vulcanized via addition crosslinking in injection moulding machines. In the case of the room temperature vulcanizing or RTV silicone rubber materials, a distinction may be made between one-component and two-component systems. The first group (RTV-1) polymerizes slowly at room temperature under the influence of atmospheric humidity, the crosslinking taking place by condensation of SiOH groups with the formation of Si—O bonds. The SiOH groups are formed by hydrolysis of SiX groups of a species forming as an intermediate from a polymer having terminal OH groups and a so-called crosslinking agent R—SiX3 (X=—O—CO—CH3, —NHR). In the case of two-component rubbers (RTV-2), for example, mixtures of silicic acid esters (for example ethyl silicate) and organotin compounds are used as crosslinking agents, the formation of an Si—O—Si bridge from Si—OR and Si—OH by alcohol elimination taking place as a crosslinking reaction.

The most well known use is in the building trade as a sealing material for filling joints. However, they are also used there for the production of impression and potting compounds and as coating materials for fabrics.

Silicone rubber materials and the use of fumed silica (AEROSIL®) in silicone rubber materials is known (Ullmann's Encyclopedia of Industrial Chemistry, Volume A 23, Rubber, 1, 221 et seq.; Rubber 3, 3, 6 et seq.; Volume A 24, Silicones, 57 et seq. 1993).

The uncrosslinked mixtures of silicone polymers, silicone oils and silica can be converted into the rubber-elastic state by addition of crosslinking agents. The crosslinking reactions can be carried out at room temperature or at elevated temperatures and are accelerated by catalysts. Depending on the respective type of crosslinking and on the intended use, it is possible to prepare 1- or 2-component systems which crosslink by polyaddition, polycondensation or free radical reactions.

Polydimethylsiloxanes which have molecular weights between 400 000 and 600 000, are prepared with addition of regulators, such as hexamethyl- or divinyltetramethyl-disiloxane, and carry corresponding terminal groups are used for elastomer applications. For improving the vulcanization behaviour and also the tear propagation strength, small amounts (<1%) of vinyl groups are often incorporated into the main chain as substituents by addition of vinylmethyldichlorosilane to the reaction mixture (VMQ).

In the case of the fillers, a distinction is made between reinforcing and non-reinforcing fillers.

Non-reinforcing fillers are characterized by extremely weak interactions with the silicone polymer. They include chalk, quartz powder, diatomaceous earth, mica, kaolin, Al(OH)$_3$ and Fe$_2$O$_3$. The particle diameters are of the order of magnitude of 0.1 μm. Their objects consist in increasing the viscosity of the mixtures in the unvulcanized state and increasing the Shore hardness and the modulus of elasticity of the vulcanized rubbers. In the case of surface-treated fillers improvements in the tensile strength can also be achieved.

Reinforcing fillers are in particular finely divided silicas having a surface area of >125 m$^2$/g. The reinforcing effect is due to bonding between filler and silicone polymer. Such bonds are formed between the silanol groups at the surface of the silicas (3-4.5 SiOH groups/nm$^2$) and the silanol groups of the α,ω-dihydroxy-polydimethylsiloxanes via hydrogen bridge bonds to the oxygen of the siloxane chain. These filler-polymer interactions result in viscosity increases and changes in the glass transition temperature and in the crystallization behaviour. On the other hand, polymer-filler bonds produce an improvement in the mechanical properties but may also result in crepe hardening of the rubbers.

A middle position between reinforcing and non-reinforcing fillers is occupied by talc. Fillers are also used for particular effects. They include iron oxide, zirconium oxide or barium zirconate for increasing the heat stability.

Regarding further constituents, the silicone rubbers may contain catalysts, crosslinking agents, coloured pigments, antiadhesive agents, plasticizers and adhesion promoters.

Plasticizers are particularly necessary for establishing a low modulus of elasticity. Internal adhesion promoters are based on functional silanes which can interact on the one hand with the substrate and on the other hand with the crosslinking silicone polymer (used mainly in RTV-1 rubbers).

Low molecular weight or monomeric silanol-rich compounds (e.g. diphenylsilanediol, $H_2O$) counteract crepe hardening. They pre-empt an excessively strong interaction of the silicone polymers with the silanol groups of the filler by reacting more rapidly with the filler. A corresponding effect can also be achieved by partial coating of the filler with trimethylsilyl groups (filler treatment with methylsilanes).

Furthermore, it is possible for the siloxane polymer to be chemically modified (phenyl polymers, boron-containing polymers) or to be blended with organic polymers (butadiene-styrene copolymers).

Condensation-crosslinking silicone rubbers vulcanize by the reaction of an Si—OH endcapped polymer with a crosslinking molecule which may be a compound of the type $Si(OR)_4$.

Flowable RTV-2 impression materials (in the case of room temperature vulcanizing 2-component systems) also have to have very high mechanical strength after curing in order to be able to take as many impressions as possible. RTV-2 impression materials are obtained if the three base constituents of the formulation (silicone polymer having crosslinkable groups, crosslinking agent and catalyst) are divided between two components so that storage-stable systems form. Depending on the type of crosslinking, the catalyst can be combined with the polymer or with the crosslinking agent. Usually, a procedure is adopted in which a base material comprising crosslinkable silicone polymer and fumed silica is prepared and the second component contains the crosslinking agent.

RTV-2 impression materials must flow freely during use without the action of strong shear forces.

The ability of silicone rubber mixtures to flow freely can be very well described by the characteristic of the flow limit, which can be measured. The flow limit is the minimum shear stress which has to be applied in order for a substance to flow (ROMPP Chemie Lexikon [ROMPP Chemistry Lexicon], 9th Edition 1990, Thieme Verlag, Stuttgart, Volume 2, page 1383). Mixtures having a high flow limit have poor flowability and mixtures having a low flow limit have good flowability. The magnitude of the flow limit is independent of the respective viscosity at different shear gradients. For example, it is possible for a mixture having a relatively high viscosity to have substantially better flow, if it has a low flow limit, than a comparative mixture having a low viscosity but which simultaneously has a substantially higher flow limit. A system which has a low viscosity in combination with a low flow limit so that high degrees of filling with fumed silica can be achieved would be optimum.

For the preparation of the mixture comprising silicone polymers, silicone oils and silicas, the so-called masterbatch method is frequently used in order optimally to disperse the filler in a portion of polyorganosiloxane. The highly viscous, partly plastic premix thus prepared is diluted with further polyorganosiloxane until an easily processable mixture forms (cf. Masterbatch Method, Handbuch der Kautschuktechnologie [Handbook of Rubber Technology], W. Hofmann, H. Gupta, 2001).

In addition to the abovementioned typical use of two-component room temperature vulcanizing silicone systems (RTV-2C) as impression materials, these systems are also used as coating materials, for example for textiles, in particular the optical properties, i.e. the transparency, taking a decisive role.

It was the object of the invention to provide flowable RTV-2C silicone materials having a low flow limit and viscosity but very high transparency and at the same time good mechanical properties, it being intended to dispense with the masterbatch method and the imparting of water repellency in situ.

The invention relates to an RTV two-component silicone rubber which is characterized in that it contains a structurally modified hydrophobic fumed silica as a filler.

In a preferred embodiment of the invention, a silanized, structurally modified silica which has vinyl groups fixed on the surface can be used as the silica, further hydrophobic groups, such as trimethylsilyl and/or dimethylsilyl and/or monomethylsilyl groups, additionally being fixed on the surface. It can be characterized by the following physicochemical properties:

| | |
|---|---|
| BET-surface area $m^2/g$: | 25-400 |
| Average size of the primary particles nm: | 5-50 |
| pH: | 3-10 |
| Carbon content %: | 0.1-10 |
| DBP number %: | <200 or not determinable |

In an embodiment of the invention, the filler may be a fumed silica which is prepared by flame oxidation or flame hydrolysis, has a specific surface area of 10 to 1000 $m^2/g$, has been rendered water repellent and is structurally modified.

The preparation of the silanized, structurally modified silica can be effected by treating silica with a surface modifier, thermally treating the mixture obtained and then structurally modifying it.

The silicas can be sprayed first with water and then with the surface modifier, optionally remixed, then thermally treated and then structurally modified.

The surface modification can be carried out by spraying the silicas optionally first with water and then with the surface modifier. The water used can be acidified with an acid, for example hydrochloric acid, to a pH of 7 to 1. If a plurality of surface modifiers are used, they can be applied simultaneously but separately, in succession or as a mixture. The surface modifier or modifiers may be dissolved in suitable solvents. After the spraying has ended, mixing can be effected for a further 5 to 30 min.

The mixture is then thermally treated at a temperature of to 400° C. over a period of 0.1 to 6 h. The thermal treatment can be effected under inert gas, such as, for example, nitrogen.

Alternatively, the process for the preparation of the silanized, structurally modified silica according to the invention can be carried out by treating the silica with the surface modifier in vapour form, thermally treating the mixture obtained and then structurally modifying it.

The alternative method of surface modification of the silicas can be carried out by treating the silicas with the surface modifier in vapour form and then thermally treating the mixture at a temperature of 50 to 800° C. over a period of 0.1 to 6 h. The thermal treatment can be effected under inert gas, such as, for example, nitrogen.

The thermal treatment can also be effected in a plurality of stages at different temperatures.

The application of the surface modifier or modifiers can be effected using airless high-pressure nozzles, binary nozzle or ultrasonic nozzles.

The surface modification can be carried out continuously or batchwise in heatable mixers and driers having spray devices. Suitable apparatuses may be, for example, ploughshare mixers, disc driers, fluidized-bed driers or fluid bed driers.

The structural modification of the silicas thus prepared can then be effected by mechanical action. The structural modification may be followed by subsequent milling. If appropriate, further heating can be effected after the structural modification and/or subsequent milling.

The structural modification can be effected, for example, using a ball mill or a continuously operating ball mill. The structural modification is disclosed in U.S. Pat. No. 6,193,795.

The subsequent milling can be effected, for example, by means of an air-jet mill, toothed-disc mill or pinned-disc mill.

The heating or thermal treatment can be effected batchwise, for example in a drying oven, or continuously, for example in a fluid bed or fluidized bed. The heating can be effected under inert gas, for example nitrogen.

The silica used may be a fumed silica, preferably a fumed silica prepared by the flame hydrolysis method from $SiCl_4$. Such fumed silicas are known from Ullmann's Enzyklopädie der technischen Chemie [Ullmann's Encyclopedia of Industrial Chemistry], 4th Edition, Volume 21, page 464 (1982).

For example, the following may be used as silicas:

All compounds which are suitable for fixing vinyl or vinylsilyl and trimethylsilyl and/or dimethylsilyl and/or monomethylsilyl groups on the silica surface are suitable as surface modifiers. Preferably, vinylsilyl and methylsilyl groups can be applied via a compound such as, for example, 1,3-divinyl-1,1,3,3-tetramethyldisilazane or dimethylvinylsilanol, or a plurality of compounds, such as, for example, vinyltriethoxysilane and hexamethyldisilazane or trimethylsilanol, to the silica.

If this low-structured fumed silica is incorporated into silicone rubber, completely novel properties of the silicone rubber result.

As a result of the structural modification, the morphology of the fumed silica changes so that a lower degree of intergrowth and hence less structure results.

The RTV-2C silicone materials are obtained by mixing
(a) at least 60% by weight of a liquid linear and/or branched polyorganosiloxane having a viscosity of 0.01 to 1000 Pa·s,
(b) 10 to 40% by weight of a structurally modified, hydrophobic, fumed silica.

All compounds known for the preparation of silicone materials, such as linear and/or branched liquid siloxanes, with or without crosslinkable groups, can be used as polyorganosiloxane.

Thus, it is possible to use polyorganosiloxanes having crosslinkable groups and/or polyorganosiloxanes having no crosslinkable groups. Examples of crosslinkable groups are silicon-bonded hydroxyl, alkoxy and/or vinyl groups and/or hydrogen. Polyorganosiloxanes having OH groups are preferably used for systems crosslinking by condensation reaction, and siloxanes having vinyl groups are preferably used

TABLE 1

| | AEROSIL TT 600 | AEROSIL 90 | AEROSIL 130 | AEROSIL 150 | AEROSIL 200 | AEROSIL 300 | AEROSIL 380 | AEROSIL OX50 |
|---|---|---|---|---|---|---|---|---|
| CAS reg. number | | | 112945-52-5 (old No.: 7631-86-9) | | | | | |
| Behaviour towards water | | | hydrophilic | | | | | |
| Appearance | | | loose white powder | | | | | |
| BET surface area[1] $m^2/g$ | 200 ± 50 | 90 ± 15 | 130 ± 25 | 150 ± 15 | 200 ± 25 | 300 ± 30 | 380 ± 30 | 50 ± 15 |
| Average size of the primary particles mm | 40 | 20 | 16 | 14 | 12 | 7 | 7 | 40 |
| Tamped density[2] | | | | | | | | |
| normal product g/l | approx. 60 | approx. 80 | approx. 50 | approx. 50 | approx. 50 | approx. 50 | approx. 50 | approx. 130 |
| compressed product (added "V") g/l | — | — | approx. 120 | approx. 120 | approx. 120 | approx. 120 | approx. 120 | — |
| Loss on drying[3] (2 h at 105° C.) % on leaving the supplier | <2.5 | <1.0 | <1.5 | <0.5[9] | <1.5 | <1.5 | <2.0 | <1.5 |
| Loss on ignition[4][7] (2 h at 1000° C.) % | <2.5 | <1 | <1 | <1 | <1 | <2 | <2.5 | <1 |
| pH[5] (in 4% strength aqueous dispersion) | 3.6-4.5 | 3.7-4.7 | 3.7-4.7 | 3.7-4.7 | 3.7-4.7 | 3.7-4.7 | 3.7-4.7 | 3.6-4.3 |
| $SiO_2$[8] % | >99.8 | >99.8 | >99.8 | >99.8 | >99.8 | >99.8 | >99.8 | >99.8 |
| $Al_2O_3$[8] % | <0.05 | <0.05 | <0.05 | <0.05 | <0.05 | <0.05 | <0.05 | <0.08 |
| $Fe_2O_3$[8] % | <0.003 | <0.003 | <0.003 | <0.003 | <0.003 | <0.003 | <0.003 | <0.01 |
| $TiO_2$[8] % | <0.03 | <0.03 | <0.03 | <0.03 | <0.03 | <0.03 | <0.03 | <0.03 |
| HCl[8][10] % | <0.025 | <0.025 | <0.025 | <0.025 | <0.025 | <0.025 | <0.025 | <0.025 |
| Sieve residue[6] % (according to Mocker, 45 μm) | <0.05 | <0.05 | <0.05 | <0.05 | <0.05 | <0.05 | <0.05 | 0.2 |

[1] according to DIN 66131
[2] according to DIN ISO 787/XI, JIS K 5101/18 (not sieved)
[3] according to DIN ISO 787/II, ASTM D 280, JIS K 5101/21
[4] according to DIN 55921, ASTM D 1208, JIS K 5101/23
[5] according to DIN ISO 787/IX, ASTM D 1208, JIS K 5101/24
[6] according to DIN ISO 787/XVIII, JIS K 5101/20
[7] based on the substance dried for 2 hours at 105° C.
[8] based on the substance ignited for 2 hours at 1000° C.
[9] special packaging providing protection from moisture
[10] HCl content in constituent of loss on ignition for systems crosslinking by addition reaction. Alkyl radicals having 1 to 18 carbon atoms, in particular methyl or ethyl radicals, or even phenyl radicals, may be bonded as groups which do not have a crosslinking effect. Liquid compounds which, in addition to mono- and/or difunctional silicon units, also have trifunctional and/or tetra-functional units may be used as branched polyorgano-siloxanes. Mixtures of different polyorganosiloxanes can also be used.

The use of polyorganosiloxanes which completely or partly comprise mono(M)- and tetra(Q)-functional units and have crosslinkable or have no crosslinkable groups is also possible. Particularly for reducing the flow limit, the use of a so-called MQ resin which may have, for example, fluorine-containing groups is advantageous. The ratio of the various functionalities is chosen so that the polymer is liquid at room temperature.

The proportion of silicas in the total RTV-2 silicone material is at least 20% by weight, based on the polyorganosiloxane used. Contents between 20 and 30% by weight are preferred since the mechanical strength of the elastomer is often too low in the case of a proportion of less than 20% by weight and the flowability of the mixture cannot always be ensured in the case of a proportion above 30% by weight.

Before, during or after the incorporation of the silica, any desired further additives specific for the respective intended use may be added. These include, for example, pigments, slightly reinforcing or non-reinforcing fillers or plasticizers and stabilizers.

The process according to the invention for the preparation of the silicone polymer-AEROSIL® mixtures having a low flow limit and high transparency is effected by mixing and homogenizing the individual constituents of the mixture. This can be effected in one mixing unit or different mixing units. Homogenization in one mixing unit of the planetary dissolver type is preferred.

After the homogenization, further organopolysiloxane which has crosslinkable groups and/or no crosslinkable groups may be added according to the formulation in order to establish the flowability and reactivity of the mixture which are required for the further processing.

It is essential to the subsequent usability of the mixture that polyorganosiloxanes having crosslinkable groups are present; these may be added either during the incorporation of the silica and/or during the adjustment of the flowable mixture. Suitable mixing units for incorporating further polyorganosiloxane are those which can also be used for the mixing and homogenization, such as differently constructed dissolvers having planetary stirrers.

It was completely surprisingly found that RTV-2C silicone materials which have low rheological properties in the uncrosslinked state and whose vulcanizates have a surprisingly high transparency can be prepared with the silicas according to the invention without carrying out the masterbatch process and the imparting of water repellency in situ.

EXAMPLES

Fumed silica is initially introduced into a mixer and sprayed first with water and then with the surface modifier or the mixture of surface modifiers. The reaction mixture is then subjected to a one-stage or multistage thermal treatment. The heated material is structurally modified using a ball mill, and subsequent milling with a toothed-disc mill is effected if required. If appropriate, the structurally modified or structurally modified and subsequently milled material is subjected to a further thermal treatment.

TABLE 2

Overview of the preparation of the silicas which can be used according to the invention (examples)

| Designation | Silica used | Amount of water (parts/100 parts of silica) | SM*) (parts/100 parts of silica) | Thermal treatment - 1st stage temp. [° C.]/ duration [h] | Thermal treatment - 2nd stage temp. [° C.]/ duration [h] | Subsequent milling**) | Thermal treatment***) temp. [° C.]/ duration [h] |
|---|---|---|---|---|---|---|---|
| KS 1 | AEROSIL ® 200 | 5 | A/5 D/5 | 140/2 | — | no | no |
| KS 2 | AEROSIL ® 300 | 5 | B/15 C/1.8 | 20/2 | 140/2 | yes | yes |
| KS 3 | AEROSIL ® 300 | 5 | A/8.5 B/20 | 50/5 | 140/1 | yes | 120/2 |
| KS 4 | AEROSIL ® 300 | 5 | A/16 B/12 | 20/6 | 120/5 | yes | 120/3 |
| KS 5 | AEROSIL ® 150 | 5 | C/20 | 130/2 | — | yes | 120/2 |
| KS 6 | AEROSIL ® 130 | 2 | C/5 D/5 | 150/3 | — | no | no |
| KS 7 | AEROSIL ® 300 | 5 | A/8.5 B/20 | 50/5 | 140/1 | no | no |
| KS 8 | AEROSIL ® 200 | 5 | B/10 C/5 | 20/20 | 140/3 | yes | no |
| KS 9 | AEROSIL ® 300 | 5 | C/16 | 20/2 | 140/2 | yes | no |
| KS 10 | AEROSIL ® 200 | 2 | A/10 B/5 | 20/2 | 140/24 | yes | 120/2 |
| KS 11 | AEROSIL ® 300 | 5 | A/8.5 B/20 | 50/5 | 140/1 | yes | no |

*)SM = surface modifier: A = vinyltriethoxysilane B = hexamethyldisilazane C = 1,3-divinyl-1,1,3,3-tetramethyldisilazane D = methyltrimethoxysilane
With the use of a plurality of SM, mixtures were used.
**)Subsequent milling = milling after structural modification
***)Thermal treatment = thermal treatment after subsequent milling 2 kg of AEROSIL® are initially introduced into a mixer and sprayed first with 0.1 kg of water and then with a mixture of 0.4 kg of hexamethyldisilazane and 0.17 kg of vinyltriethoxysilane with mixing. After the end of spraying, mixing is effected for a further 15 minutes and the reaction mixture is heated first for 5 hours at 50° C. and then for 1 hour at 140° C.

The silica according to the invention and the comparative material are processed according to this method. The results for the performance characteristics are shown in Tables 1 and 2. The transparency is 24% higher in the case of the vulcanizate which was prepared with the silica according to the invention; the viscosity is 78% lower after the incorporation and 65% lower after storage. The flow limit is 2000 Pa in the case of the comparative example compared with only 50 Pa in the case of the silica according to the invention.

TABLE 3

Physicochemical data of the silicas which can be used according to the invention (examples) and of the comparative silica

| Designation | Tamped density [g/l] | Loss on drying [%] | Loss on ignition [%] | pH | C content [%] | DBP adsorption [%] | BET specific surface area [m$^2$/g] |
|---|---|---|---|---|---|---|---|
| Comparative silica | 48 | 0.9 | 4.1 | 9.0 | 4.0 | n.d. | 197 |
| KS 1 | 236 | 1.2 | 1.6 | 4.4 | 1.1 | 9.7 | 136 |
| KS 2 | 147 | 0.7 | 3.8 | 6.2 | 3.8 | n.d. | 201 |
| KS 3 | 120 | 0.4 | 3.6 | 7.5 | 4.0 | n.d. | 191 |
| KS 4 | 132 | 0.5 | 3.0 | 5.2 | 3.5 | 128 | 189 |
| KS 5 | 138 | 0.2 | 2.8 | 5.5 | 2.8 | n.d. | 103 |
| KS 6 | 249 | 0.8 | 1.1 | 6.3 | 1.5 | 91 | 79 |
| KS 7 | 266 | 1.1 | 3.4 | 8.5 | 4.0 | 121 | 204 |
| KS 8 | 161 | 0.9 | 2.7 | 6.1 | 4.3 | 91 | 117 |
| KS 9 | 132 | 1.0 | 4.0 | 6.7 | 4.9 | n.d. | 205 |
| KS 10 | 149 | 0.6 | 2.8 | 5.1 | 2.8 | n.d. | 155 |
| KS 11 | 163 | 0.8 | 3.5 | 8.5 | 4.0 | n.d. | 197 |

Testing of the Structurally Modified Fumed Silicas in Silicone Rubber
Preparation of the RTV Two-Component Silicone Rubber Mixtures The preparation of the mixtures was effected using a laboratory dissolver.
Formulation:

| 60% of silicone polymer | Silopren C 18 (GE Bayer Silicones) |
| 20% of silicone oil | Silicone oil M 100 (GE Bayer Silicones) |
| 20% of silica | |

Apparatuses:
Dissolver

| Disc diameter: | d = 70 mm |
| Speed | n1 = 500 min$^{-1}$ |
| | n2 = 3000 min$^{-1}$ |

Procedure:
180 g of silicone polymer Silopren C18 and 60 g of silicone oil M100 are weighed into the stirred vessel and the dissolver disc is completely immersed. Homogenization is then effected at a speed n1=500 rpm for 1 minute.
60 g of silica are then incorporated at the same speed.
As soon as the silica has been completely incorporated, the speed is increased to n2=3000 rpm and dispersing is effected for 5 minutes with cooling.
The mixture is then deaerated in a vacuum cabinet.
280 g are filled into a stainless steel beaker (d=100 mm, h=100 mm) for vulcanization.
The remainder is filled into a PE beaker and the viscosity and the flow limit are measured on the same day.
After storage for 7 days at room temperature, the subsequent thickening is also determined.

TABLE 1

Rheological properties of RTV-2C silicone rubber

| | Flow limit [Pa] | | Viscosity D = 10 s$^{-1}$ Pa · s | |
|---|---|---|---|---|
| Silica | after incorporation | after 7 days | after incorporation | after 7 days |
| Comparative example | 0 | 2000 | 263 | 370 |
| Example | 0 | 50 | 31 | 132 |

TABLE 2

Mechanical and optical properties of the RTV-2 vulcanizates

| Silica | Tensile strength [N/mm$^2$] | Elongation at break [%] | Hardness [Shore A] | Resilience [%] | Transparency [DE*/D65] |
|---|---|---|---|---|---|
| Comparative example | 4.3 | 360 | 45 | 63 | 29 |
| Example | 3.5 | 420 | 33 | 65 | 38 |

The invention claimed is:
1. A vulcanizable RTV two-component silicone rubber, comprising:
a silicone polymer, a silicone oil and a structurally modified hydrophobic fumed silica filler;
wherein the filler is surface modified and has vinyl groups bonded to the silica surface, at least one of trimethylsilyl groups, dimethylsilyl groups and monomethylsilyl groups bonded to the surface of the silica, and at least one alkoxysilyl group bonded to the surface of the silica, and wherein the filler is a fumed silica prepared by flame oxidation or flame hydrolysis, and subsequent surface modification followed by structural modification under mechanical action, and has a BET specific surface area of from 10 to 136 m²/g.

2. The RTV two-component silicone rubber according to claim 1, wherein the structurally modified hydrophobic fumed silica is obtained by mechanically modifying a fumed silica having surface groups selected from the group consisting of vinyl groups, hydrophobic groups and mixtures thereof.

3. The RTV two-component silicone rubber according to claim 1, wherein the mechanical action is a ball mill.

4. A vulcanizate obtained by vulcanizing the RTV two-component silicone rubber according to claim 1, wherein the vulcanizate has a transparency at least 24% higher than a comparative vulcanizate differing only in the absence of the structural modified hydrophobic fumed silica.

5. The RTV two-component silicone rubber according to claim 1, wherein the filler is present in an amount of at least 20% by weight.

6. The RTV two-component silicone rubber according to claim 1, wherein the silicone polymer is a branched polyorganosiloxane having a viscosity of 0.01 to 1000 Pa·s and from 10 to 40% by weight of the filler.

7. A vulcanizate obtained by vulcanizing the RTV two-component silicone rubber according to claim 1.

8. The vulcanizable RTV two-component silicone rubber according to claim 1, wherein the filler has a surface modified with hexamethyl disilazane and vinyl triethoxysilane.

9. The vulcanizable RTV two-component silicone rubber according to claim 1, wherein the filler has a surface modified with trimethylsilyl groups and vinylethoxysilyl groups.

* * * * *